(No Model.)

R. M. REILLY.
PIPE JOINT.

No. 367,929. Patented Aug. 9, 1887.

WITNESSES
J. H. MacDonald
Newton B Lovejoy

INVENTOR
Robt. M. Reilly
by J. J. Johnston
*Attorney*

UNITED STATES PATENT OFFICE.

ROBERT M. REILLY, OF BALTIMORE, MARYLAND.

PIPE-JOINT.

SPECIFICATION forming part of Letters Patent No. 367,929, dated August 9, 1887.

Application filed December 29, 1886. Serial No. 222,860. (No model.)

*To all whom it may concern:*

Be it known that I, ROBERT M. REILLY, a citizen of the United States, residing at Baltimore, in the State of Maryland, have invented certain new and useful Improvements in Pipe-Joints; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in pipe-joints, especially such as are adapted to connect the tubing of the traps of wash-basins or of the bowls of water-closets, its main objects being to make a cheap, simple, and effective joint, and to bring the trap, when the joint is connected thereto, immediately below and in contact with the bottom of the basin or bowl, in order to avoid any empty space above the trap, and thus prevent the accumulation of sewer-gas or ordinary refuse matter between the trap and the basin or bowl.

The invention consists, mainly, in the construction of the meeting ends of the pipes forming the joint, and in the construction and arrangement of the parts binding the said ends together.

It consists, further, in the manner of connecting the trap to the upper end of the lower pipe of the joint, and in joining the trap to the upper pipe in the same manner that the pipes are jointed together when the trap is not used, so that the trap will be in all respects an equivalent to said upper end, and will at the same time perform an additional important function.

Figure 1:
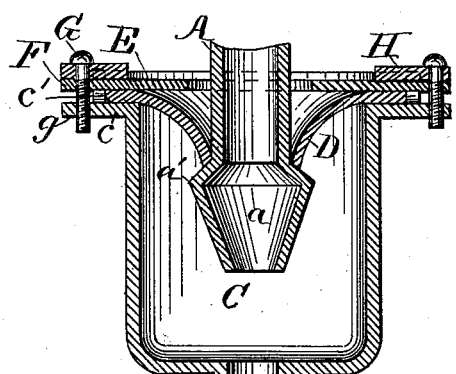
Figure 2:
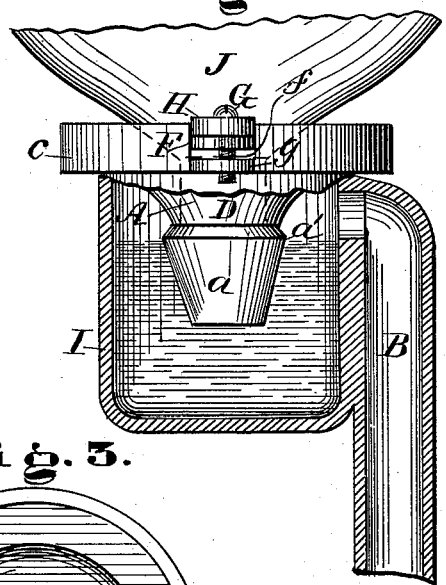
Figure 3:
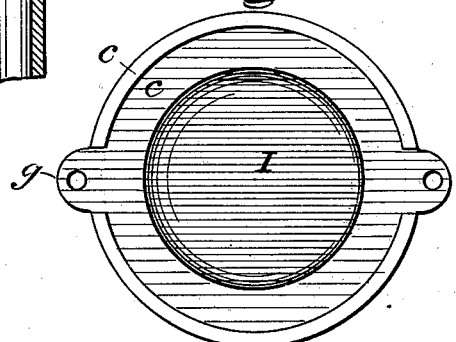
Figure 4:
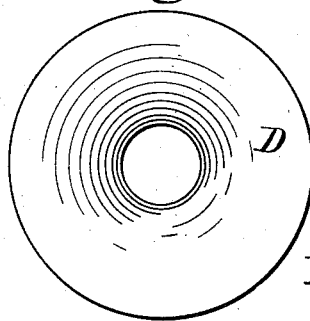
Figure 5:
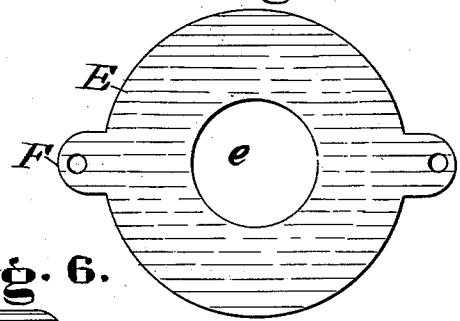
Figure 6:

In the accompanying drawings, Figure 1 represents a vertical central section of the joint when the trap is not used. Fig. 2 represents a view of the device when the trap is used, the upper portion of said view being unsectioned and the lower portion sectioned vertically and centrally. Fig. 3 is an end view of the trap to show the points to which the washers are attached. Fig. 4 is a plan view of the elastic washer when bent as in use. Fig. 5 is a plan view of the metal washer. Fig. 6 is a detail view of one of the retaining-blocks.

Referring to the accompanying drawings, A designates the upper pipe of the joint, having its lower end, $a$, either bulged out or formed with an angular circumferential shoulder, $a'$, the upper portion of which inclines downward and outward and the lower portion downward and inward, as shown in the drawings, the latter construction being preferable to the former.

B is the lower pipe of the joint, the upper end, C, of which pipe is enlarged, and is either cylindrical or in the form of an inverted frustum of a cone. Around the edge of the end C is the circumferential flange $c$, which stands first horizontally outward and then turns or bends vertically upward, so as to form the circumferential recess $c'$ upon the end of the part C.

D is an elastic washer having a central opening, the edge of which fits tightly upon the periphery of the upper tube, A, when the said tube is inserted into the opening, the latter being considerably smaller in diameter than said periphery. The washer is made of rubber or other equivalent elastic material, and is of sufficient diameter for its edge to lie in the recess $c'$ and rest snugly against the upwardly-extending part thereof. The washer D is passed upon the pipe A by stretching the opening in the washer over the enlarged end $a$ and shoulder $a'$ of said pipe, so that when on the pipe the edge of the opening will bind very tightly and hold very strongly on the upper part of said shoulder. When the pipe A is thus inserted in the opening of the washer, its lower end, $a$, is passed into the open end of the enlarged portion C of the lower pipe, so that the edge of the washer bears against the shoulder $a'$ and is bent upward thereby, the washer assuming a general inverted conical shape with its surfaces concaved slightly inward.

E is a metallic washer having a central opening, $e$, which can be passed up over the end $a$ of the tube A, the metal washer being passed up before the rubber washer and before the upper tube is inserted into the lower tube. The washer E has upon its periphery, at diametrically-opposite points, the outstanding ears or lugs F, provided with threaded perforations, and when in place the said lugs lie in corresponding notches, $f$, made in the upwardly-extending part of the flange $c$.

G G are screws each of which passes through and engages the perforation in one of the lugs F, and also engages in a similar threaded perforation in a lug or ear, g, standing out from the bottom of the corresponding notch, f.

H H are perforated retaining-blocks, through the perforations of which pass the corresponding screws, G, each block lying in a notch, f, above the washer E, and aiding to hold it firmly in place. When the screws are turned entirely down, the washer E binds the edges of the rubber washer D in place, and at the same time prevents the opening of the latter washer from being turned upward should the pipe A be pulled upward.

It is evident that the above-described joint is flexible, cheap of construction, easily made and put together, and that it will admit of a sufficient degree of extension to allow for expansion and contraction.

When the joint is used with a trap, the lower pipe, B, is secured to the side of the said trap I, and opens into the same just below the flange c on its upper end. The trap I is preferably cylindrical, and is the counterpart of the enlarged end C of the lower tube, being provided with the flange c, recess c', and other parts on said end C, and is similarly joined to the lower end of the upper tube, A, so that a further description thereof is not necessary. When the trap is used, the upper end of the tube A should be made in one piece with the basin or bowl J of the closet, and should depend therefrom, so as to receive the discharge from its bottom; or the tube may be secured to the basin by a threaded upper end, or in any other suitable manner.

Some of the advantages of a trap thus constructed are that it can be made cheaply, of few parts, and can be readily put together, and on account of its construction the tube A can be made very short, so that the trap will rest immediately, or nearly so, upon the bottom of the basin and avoid any space between the basin and the trap for the accumulation of sewer-gas or other refuse material. The trap has the usual water-seal between the lower opening of the pipe A and the upper opening of the pipe B, as shown in the drawings.

The only difference between the enlarged end C and the trap I is that the tube B enters the bottom of the former and the side of the latter near its top.

It is obvious that my peculiar construction of pipe-joint enables me to instantaneously connect or disconnect the pipes without resort to tools, as no screws or nuts require to be removed.

Having described my invention, what I claim as new, and desire to secure by Letters Patent, is—

1. In a pipe-joint, the combination of a lower pipe having an enlarged upper end provided with an expansible or elastic inwardly-projecting flange firmly secured to its upper edge, and an upper pipe having an enlarged lower end adapted to be forced through the elastic flange into the upper end of the lower pipe, whereby the said flange is caused to bend downward and tightly inclose the upper part of the enlarged end of the upper pipe when the sections are connected and to yield and permit the sections to be readily and instantaneously disconnected without the use of a wrench or other tools, substantially as and for the purpose specified.

2. In a pipe-joint, the upper pipe having the enlarged lower end, the lower pipe having the enlarged upper end provided with the circumferential flange and the circumferential recess formed by said flange, the washer made of rubber or equivalent elastic material, with its circumferential part resting snugly in the recess in the lower pipe, and having a central opening adapted to be stretched over the enlargement of the upper pipe and bind strongly upon the upper part of said enlargement, the metal washer having the large central opening and lying in the recess of the lower pipe above the rubber washer, and means, substantially as described, for binding the metal washer down on the rubber washer.

3. In a pipe-joint, the combination of the lower pipe having the enlarged end C, provided with the flange c, recess c', notches f, and lugs g, provided with threaded perforations, the upper pipe provided with the enlarged lower end, a, having the shoulder a', the rubber washer D, the metal washer E, provided with the lugs F, having threaded perforations, the screws G, and perforated retaining-blocks H, all constructed and arranged substantially as and for the purpose specified.

4. The combination of the trap I, the lower pipe opening into the trap I near the top of the latter, the upper pipe having the described enlarged end inserted into the trap a sufficient distance below the said opening of the lower pipe, the rubber washer D, and the metal washer E, secured to the top of the trap above the rubber washer, substantially as specified.

5. The combination of the trap I, the pipe B, opening into said trap near its upper end, the rubber washer D, and the metal washer E, with the basin or bowl J and the pipe A, having the enlarged lower end, a, and short enough to cause the basin, when said end is inserted into the trap, to impinge against the lower surface of the trap for the purpose of leaving little or no air-space between the trap and basin, substantially as specified.

In testimony whereof I affix my signature in presence of two witnesses.

ROBERT M. REILLY.

Witnesses:
EDWD. J. UNDERWOOD,
NOAH CLARK.